United States Patent [19]
Dehennau et al.

[11] Patent Number: 5,510,401
[45] Date of Patent: Apr. 23, 1996

[54] STARCH-BASED COMPOSITION

[75] Inventors: Claude Dehennau; Thierry Depireux, both of Waterloo, Belgium

[73] Assignee: Solvay (Société Anonyme), Brussels, Belgium

[21] Appl. No.: 227,230

[22] Filed: Apr. 12, 1994

Related U.S. Application Data

[63] Continuation of Ser. No. 14,679, Feb. 8, 1993, abandoned.

[30] Foreign Application Priority Data

Feb. 7, 1992 [BE] Belgium ................. 09200130

[51] Int. Cl.$^6$ ............... C08L 3/00; C08L 89/00; C08K 5/10; C08K 5/05
[52] U.S. Cl. .............. 524/47; 524/312; 524/387
[58] Field of Search ............... 524/47, 312, 387

[56] References Cited

U.S. PATENT DOCUMENTS 5,026,745  6/1991  Weil .......................... 524/47

FOREIGN PATENT DOCUMENTS

409788A2  1/1991  European Pat. Off. .
91/02025  2/1991  WIPO .

OTHER PUBLICATIONS

Lin, Chen–Chong et al, "Studies on multicomponent polymers. VI. PE/starch/calcium carbonate polyblends", Chemical Abstracts, vol. 92, No. 10, Mar. 10, 1980, p. 27.

*Primary Examiner*—Paul R. Michl
*Assistant Examiner*—La Vonda R. DeWitt
*Attorney, Agent, or Firm*—Spencer & Frank

[57] ABSTRACT

The invention relates to an alloy composition possessing improved properties of mechanical resistance. The composition contains a starch, which is preferably plasticised, and a polymer which acts as coupling agent which is chosen from the group consisting of polyolefins modified by chemical functional groups which are active towards the hydroxyl functional groups of starch.

Generally, the composition also contains a thermoplastic polymer.

The invention also relates to the process for preparing this composition and the use of these compositions for the manufacture of films intended for the paper market and for packages made from biodegradable plastic.

18 Claims, No Drawings

STARCH-BASED COMPOSITION

This application is a Continuation of application Ser. No. 08/014,679, filed Feb. 8, 1993, now abandoned.

SUBJECT OF THE INVENTION

The present invention relates to a composition based on optionally plasticised starch possessing improved properties, especially of transparency and of mechanical resistance, by virtue of the presence of a coupling agent optionally comprising a thermoplastic polymer.

The invention also relates to the process for preparing the composition according to the invention and to its use.

STATE OF THE ART AND TECHNOLOGICAL BACKGROUND

Starch constitutes an important source of macro-molecules since it is renewable by means of the photosynthesis cycle, and it is available in large amounts, is biodegradable and is inexpensive.

Owing to its chemical and physical structure, starch is not intrinsically a thermoplastic and it is mainly used in water-based preparations as a binder, thickener or foodstuff.

Attempts have therefore been made to modify starch by plastifying it and/or by subjecting it to an appropriate heat treatment so as to render it workable at high temperature.

The use of a starch which is structurally modified during a preliminary processing such as an extrusion and, optionally, the addition of water, which renders the final product mouldable at high temperature, has been proposed in European Patent Application EP-A-0 304 401 (Warner Lambert Co.).

Additional components such as plasticisers comprising polyalkylene glycol or glycerol acetate can also be incorporated into structurally modified starch.

The use of another structurally modified starch, whose viscosity has been reduced by means of a depolymerisation catalyst, is proposed in European Patent Application EP-A-0 282 451 (Warner Lambert Co.).

Additional components such as plasticisers, diluents or fillers can also be incorporated into starch.

The extrusion of thermoplastic starch in the form of a mixture of a starch, which is at least partially crystalline, with water and/or other additives such as glycerine (5 to 35% by weight relative to the total weight of the mixture), which reduce its melting point (see page 27, lines 1 to 7 and claim 13), is known from the document WO-90 10 019 (Tomka).

A technique for heating and mixing starch with other additives which permit melting of the starch at a temperature lower than its decomposition temperature, is known from patent application WO-90 05 161 (Tomka).

However, starch which is treated by these processes remains a hydrophilic material which absorbs water, which plasticises it and causes it to loose all mechanical properties. This constitutes a major obstacle to a mass use of this product, although the hydrophilic character also constitutes a property which is essential for good biodegradability.

Research studies have therefore also been carried out in order to reduce the sensitivity of starch to water, especially by coating the starch with a hydrophobic compound.

European Patent Application EP-0 378 646-A (Tomka) (equivalent to WO-90 00 1043) describes the coating of a hydrophilic polymer such as starch or gelatine with a film-forming hydrophobic compound consisting of polyhydroxycarboxylic acid, optionally supplemented with proteins, natural lipids, wax and/or paraffin.

The document "Starch-based film for Degradable Agricultural Mulch" (Ind. Eng. Chem. Prod. Res. Develop. vol. 13 (1), 1974, p. 90) describes a coating with polyvinyl chloride (PVC) or with a vinylidene chloride and acrylonitrile copolymer, of a film of starch supplemented with polyvinyl alcohol (PVA) and cross-linked with formaldehyde.

Mixtures of starch with copolymers have also been described in the following documents:

U.S. Pat. No. 4,133,784 (U.S. Secretary of Agriculture) and the document "Composites of starch and polyethylene coacrylic acid, complexing between polymer components", (Journal of Applied Polymeric Science, vol. 40, pp. 811 to 821, 1990) mention a composite material based on starch and an ethylene and acrylic acid (EAA) copolymer which is described as being stable under atmospheric conditions only for limited periods of time.

Patent EP-0 408 503-A (Warner Lambert Co.) describes a composite material consisting of structurally modified starch and ethylene-vinyl alcohol type (EVOH) copolymers and optionally a thermoplastic polymer which is insoluble in water.

However, the products obtained are found to be fragile and tear easily directly after their processing, and during storage they soften with the absorption of water and the plasticisation which it produces.

OBJECT OF THE INVENTION

The invention is intended to provide a composition based on a starch modified by the addition of a so-called polymer coupling agent which confers on the thermoformed starch improved properties, in particular improved properties of transparency, tear strength and reduced bleaching during folding.

Additionally, the present invention is intended to provide an agent which acts as compatibility-promoting agent for a mixture of starch with a thermoplastic polymer and which enhances the mechanical resistance properties of the said mixture.

CHARACTERISTIC FEATURES OF THE INVENTION

The addition to starch of polymers such as polyolefins which reduce the penetration of water by their natural hydrophobicity, can be envisaged so that these mixtures possess improved properties of resistance to moisture. Mixtures of this type, in particular mixtures of polyolefins and starch are however very heterogeneous since very polar starch is incompatible with an apolar polyolefin.

According to the invention, an alloy composition is proposed which possesses improved properties of transparency and mechanical resistance, comprising a starch and a polymer acting as coupling agent which is chosen from the group consisting of polyolefins modified by chemical functional groups which are active towards the hydroxyl functional groups of starch, which is characterised in that the ratio of its dynamic modulus of elasticity G' to its dissipative modulus G", measured at 160° C. and at a frequency of 0.1 rad per s (0.1 s$^{-1}$), is greater than 1.6, and preferably greater than 1.7.

Details on the measurement and the physical significance of the G' and G" moduli are given in a description below of the preferred embodiments of the invention.

According to a preferred embodiment of the invention, the polymer which acts as coupling agent is chosen from the group consisting of polyolefins modified by grafting maleic anhydride, and of ethylene copolymers and terpolymers containing units derived from maleic anhydride.

The use of starch supplemented with a plasticiser, in particular glycerine, diglycerine, polyglycerine and/or sorbitol, can prove to be advantageous in many cases.

According to another preferred embodiment of the invention, the composition also comprises a thermoplastic polymer which is preferably a polyolefin such as polyethylene.

The starches used are of natural and plant origin. These carbohydrates are mainly composed of amylose and/or amylopectin which occur in variable amounts depending on their biological origin. They may be structurally modified, pregelatinised or modified after the addition of water and/or a plasticiser as described above according to the process described in patent application WO-90 10 019 (Tomka).

By way of non-limitative example, the starch may be a normal maize starch, a maize starch high in amylose (EURYLON 7® from Roquette), a maize starch high in amylopectin (Waxilys® from Roquette), a wheat starch (Nutralys® from Roquette), a potato starch or a mixture thereof.

Preferably, the starch used in the compositions of the invention is a starch whose amylopectin content is greater than 70%, which makes it possible to obtain products which are more transparent, colourless and non-sticky after retaining water on contact with atmospheric moisture.

The values of the percentages by weight of the various components of the alloy according to the invention are respectively of the order of 20 to 80%, and preferably 40 to 60% of starch, preferably plasticised starch, 0 to 70%, and preferably 30 to 50% of thermoplastic polymer, and 1 to 30%, preferably 5 to 20% of coupling agent.

When plasticised starch is used, it may contain up to 50% by weight of plasticiser, preferably, however, of the order of 5 to 40% by weight of plasticiser, expressed relative to the total weight of the starch and the plasticiser.

The polymers serving as the coupling agents used in the compositions according to the invention are, as already indicated, compounds which possess chemical functional groups which are active towards the hydroxyl functional groups of the starch.

These polymers are not very crystalline and have a melting point of less than 150° C.

Advantageously, the coupling agent can also be used to make a thermoplastic polymer starch-compatible.

The addition of a thermoplastic polymer, in particular a polyolefin such as polyethylene which reduces the penetration of water by virtue of its natural hydrophobicity, gives an alloy which possesses improved moisture resistance properties.

In the compositions containing 20 to 80%, preferably 40 to 60% of plasticised starch, the incorporation of 10 to 70%, preferably 30 to 50% of a thermoplastic polymer, and of 1 to 30%, preferably 5 to 20% of a compatibility-promoting agent, also makes it possible to increase the breaking elongation properties, at various temperatures, of the products of the invention.

Another aspect of the invention relates to a process for preparing a starch-based composition in which a plasticisation means is supplied with a mechanical mixture containing the coupling agent, the starch supplemented with a plasticiser which may be precompounded, and optionally a thermoplastic polymer. The plasticisation means may be a co-rotating twin screw extruder equipped with one or more degassing vents or an inner mixer which melts the mixture. The starch may be either dried or not before being incorporated into the mixture, and it may be in a form of a powder impregnated with plasticiser or in the form of granules which are plasticised during a preliminary compounding operation.

DESCRIPTION OF THE PREFERRED EMBODIMENTS OF THE INVENTION

The products entering into the compositions of the invention are melted and homogenised with a co-rotating twin screw extruder or a laboratory Brabender® plastograph inner mixer according to the conditions described in the examples below.

Rheological measurements are then carried out on a 1 mm thick plate obtained by hot pressing the mixtures thus produced and drying at 70° C. under vacuum for 12 hours.

The rheological measurements show that the formulations which are most resistant to tearing, which are the least bleached during folding and which are most transparent, are those which have a ratio of their dynamic modulus G', representative of their elastic response (shear storage modulus), to their dissipative modulus G" (shear loss modulus), measured at a temperature of 160° C. and at a frequency of 0.1 rad per second (0.1 s$^{-1}$), greater than 1.6 and preferably greater than 1.7, and that the choice of maleic anhydride-containing copolymer or terpolymer is advantageous.

The physical significance of the G' and G" moduli, the expressions linking them and other details relating to them have been described in the document "Viscoelastic properties of polymers" by J. D. Ferry, 2nd edition, John Wiley & Sons, Inc. 1970 (pages 12 to 15).

The G' and G" moduli are evaluated at 160° C. using a rheometer which makes it possible to measure the dynamic mechanical properties of the polymers from the glassy or crystalline state to the molten state. The measurements in the molten state are carried out on tablets 1 to 2 mm thick and 2.5 cm in diameter taken from plates which are pressed from the compositions according to the invention.

The measurement consists in determining, at a frequency of 0.1 rad per second (0.1 s$^{-1}$), at a temperature of 160° C., the G' and G" moduli on the various alloy compositions of the invention, on a common base formula containing 75% by weight of starch+plasticiser and 25% by weight of compatibility-promoting agent.

The examples below illustrate the invention.

Example 1 (reference)

38.9 g of starch is mixed with 13.6 g of glycerine and 17.5 g of Dowlex® low density linear polyethylene type 4000E. This mixture is introduced into a laboratory Brabender® plastograph inner mixer heated to a constant temperature of 160° C. and then mixed for 10 minutes at a cam rotating speed of 50 revolutions/minute. After the mixing, the molten mass is collected. After it has cooled, a portion of it is collected and pressed in a press, either with a thickness of 0.35 mm in order to evaluate the transparency, the homogeneity and the tear strength on the one hand, or with a thickness of 1 mm in order to evaluate the G' and G" moduli by means of a Rheometrics® rheometer and at a temperature of 160° C. At 0.1 s$^{-1}$, the G'/G" ratio is 1.15. The film obtained is found to be heterogeneous and to tear easily.

Example 2 (reference)

The procedure is the same as in Example 1 except that LLDPE is replaced by an ethylene/acrylic and methacrylic acid copolymer containing 26% of Escor® acrylic and methacrylic acid type ATX 325. The G'/G" ratio is equal to 1.34 and the films obtained tear easily.

Example 3 (reference)

The procedure is the same as in Example 1 except that LLDPE is replaced with a Lotryl® ethylene/acrylic ester copolymer type 3400. The G'/G" ratio is equal to 1.27 and the films are heterogeneous and fragile.

Example 4

The procedure is the same as in Example 1 except that LLDPE is replaced with Admer® maleic anhydride-grafted polyethylene type L2100. The G'/G" ratio is equal to 1.67 and the films obtained are homogeneous, resistant to tearing but become bleached at the position of a fold.

Example 5 (reference)

The procedure is the same as in Example 1 except that LLDPE is replaced with a Lotader® ethylene/acrylic ester/ maleic anhydride terpolymer type 3700. The G'/G" ratio is 1.47; the films tear and are heterogeneous.

Example 6

The procedure is the same as in Example 1 except that a type 3410 Lotader® is used. The G'/G" ratio is 1.71 and the films are homogeneous, are difficult to tear and do not bleach at the position of a fold.

Example 7

The procedure is the same as in Example 1 except that a type 3200 Lotader® is used. The G'/G" ratio is 2.11 and the films are homogeneous, resistant to tearing and do not bleach at the position of a fold.

Example 8 (reference)

The procedure is the same as in Example 1 except that a Rexpearl® ethylene/glycidyl methacrylate copolymer type RA3150 is used. The G'/G" ratio is 1.45 and the films obtained tear and are heterogeneous.

Example 9 (reference)

The procedure is the same as in Example 1 except that a Rexpearl® ethylene/glycidyl methacrylate/acrylic ester terpolymer type JS4450 is used. The G'/G" ratio is 1.38 and the films tear and are heterogeneous.

Example 10

The compound obtained in Example 7 is granulated. 42 g of these granules are mixed with 28 g of Dowlex® linear low density polyethylene type 4000E. The mixture is subjected to the same procedure as that described in Example 1. The films obtained are homogeneous, do not tear and do not become bleached at the position of a fold.

Example 11

The compound obtained in Example 6 is granulated. 42 g of these granules are mixed with 28 g of Dowlex® linear low density polyethylene type 4000E. The films obtained are homogeneous, do not tear and do not become bleached at the position of a fold. The percentage of breaking elongation measured, after the water regain has stabilised, at 23° C., with an IVSTRON apparatus (speed 100 mm/minute), is 90%, and at 190° C., with a Rheometrics® elongational viscosimeter (speed gradient=0.5 s$^{-1}$) is 1420%.

Example 12 (reference)

The same test as that of Example 11 is carried out except that the compound prepared in Example 1 is used as starting material. The films obtained tear and are heterogeneous. The percentage of breaking elongation, measured under the same conditions as that for Example 11, is 41% at 23° C. and 346% at 190° C.

Example 13

34.125 g of Roquette® normal, native and non-dried maize starch (12.5% by weight of water) are mixed with 18.375 g of glycerine and with 17.5 g of Lotader® 3200. The mixture is mixed and processed according to the procedure used in Example 1. The G'/G" ratio is 1.95 and the quality of the films obtained is equivalent to that observed during examination of the films of Example 7.

Example 14

22.75 g of Roquette® normal, native and non-dried maize starch (12.5% by weight of water) are mixed with 12.25 g of glycerine, 28 g of Dowlex® 4000E and 7 g of Lotader® 3200. The whole is mixed and processed according to the procedure used in Example 1. The quality of the films is equivalent to that of the films of Example 10.

The products obtained can be used for the manufacture of films intended for the paper market or for packages made from biodegradable plastic.

We claim:

1. A composition, comprising a starch and a polymer acting as coupling agent which is chosen from the group consisting of polyethylene modified by grafting maleic anhydride, and terpolymers containing units derived from maleic anhydride, the ratio of the dynamic modulus of elasticity G' of said composition to the dissipative modulus G" of said composition, measured at 160° C. and at a frequency of 0.1 rad per s (0.1 s$^{-1}$), being greater than 1.6.

2. The composition according to claim 1, wherein the G'/G" ratio is greater than 1.7.

3. The composition according to claim 1, wherein the starch is plasticised with a plasticiser selected from the group consisting of glycerine, diglycerine, polyglycerine, sorbitol, a polyol and mixtures thereof.

4. The composition according to claim 1, further comprising a polyethylene.

5. The composition according to claim 1, wherein the starch used is destructurized or pregelatinised.

6. The composition according to claim 1, wherein the starch contains more than 70% by weight of amylopectin.

7. The composition according to claim 4, wherein said composition comprises from about 20 to 80% by weight of starch, from about 0 to 70% by weight of polyethylene and from about 1 to 70% by weight of coupling agent.

8. The composition according to claim 5, wherein the starch used contains up to about 50% by weight of plasticiser expressed relative to the total weight of the starch and the plasticiser.

9. A biodegradable film comprising a composition according to claim 1.

10. A process for preparing a composition, comprising starch and a polymer acting as a coupling agent which is chosen from the group consisting of polyethylene modified by grafting maleic anhydride, and terpolymers containing units derived from maleic anhydride, the ratio of the dynamic modulus of elasticity G' of said composition to the dissipative modulus G" of said composition, measured at 160° C. and at a frequency of 0.1 rad per s (G'/G"), being greater than 1.6, said process comprising plasticising a mixture comprising the coupling agent and starch.

11. The process according to claim 10, wherein said mixture is plasticised with an inner mixer.

12. The process according to claim 10, wherein the plasticisation means is a co-rotating twin screw extruder.

13. The process according to claim 10, wherein a mixture is used which comprises a plasticised starch compound and a coupling agent.

14. The process according to claim 10, wherein a mixture is used which comprises a native, pregelatinised or modified starch, a plasticiser and a coupling agent.

15. A process for preparing a biodegradable film, comprising the process defined in claim 10.

16. A composition, comprising a starch and a polymer acting as coupling agent, selected from the group consisting of polyethylene modified by grafting maleic anhydride, and terpolymers containing units derived from maleic anhydride, the ratio of the dynamic modulus of elasticity G' of said composition to the dissipative modulus G" of said composition being greater than 1.6.

17. A process for preparing a composition comprising starch and a polymer acting as a coupling agent, selected from the group consisting of ethylene modified by grafting maleic anhydride, and terpolymers containing units derived from maleic anhydride, the ratio of a dynamic modulus of elasticity G' of said composition to the dissipative modulus G" of said composition being greater than 1.6, said process comprising plasticising a mixture comprising the starch and coupling agent.

18. The process according to claim 17, wherein said mixture is plasticised with an inner mixer.

* * * * *